(12) United States Patent
Lin

(10) Patent No.: US 11,841,747 B2
(45) Date of Patent: Dec. 12, 2023

(54) CASE STRUCTURE FOR TABLET COMPUTERS

(71) Applicant: Guangzhou Roiskin Technology Company, Guangdong (CN)

(72) Inventor: Yuying Lin, Guangdong (CN)

(73) Assignee: Guangzhou Roiskin Technology Company, Guangzhou (CN)

(*) Notice: Subject to any disclaimer, the term of this patent is extended or adjusted under 35 U.S.C. 154(b) by 282 days.

(21) Appl. No.: 17/468,733

(22) Filed: Sep. 8, 2021

(65) Prior Publication Data

US 2023/0010995 A1 Jan. 12, 2023

(30) Foreign Application Priority Data

Jul. 8, 2021 (CN) .......................... 202121564731.0

(51) Int. Cl.
*G06F 1/16* (2006.01)
(52) U.S. Cl.
CPC .......... *G06F 1/1656* (2013.01); *G06F 1/1626* (2013.01)
(58) Field of Classification Search
CPC ..... A45C 11/00; G06F 1/1628; G06F 1/1626; G06F 1/1656; H04B 1/3888
USPC .............. 206/45.24, 45.26, 320, 45.23, 45.2; 361/679.55; 455/575.8
See application file for complete search history.

(56) References Cited

U.S. PATENT DOCUMENTS

| | | | | |
|---|---|---|---|---|
| 6,109,434 A | * | 8/2000 | Howard, Jr. | G06F 1/1616 206/521 |
| 7,886,903 B1 | * | 2/2011 | Wurzelbacher, Jr. | G06F 1/1616 206/320 |
| 8,690,210 B1 | * | 4/2014 | May | G06F 1/163 224/217 |
| 9,074,725 B2 | * | 7/2015 | Trotsky | F16M 11/105 |
| 9,949,541 B2 | * | 4/2018 | Kantor | A45C 11/00 |
| 10,113,691 B2 | * | 10/2018 | Grieve | G06F 1/1626 |
| 10,595,622 B2 | * | 3/2020 | Carnevali | A45F 5/10 |
| 11,131,422 B2 | * | 9/2021 | Tsui | F16M 11/041 |
| 11,190,228 B1 | * | 11/2021 | Macias | A45C 11/00 |
| D963,655 S | * | 9/2022 | Ding | D14/440 |
| 2011/0267748 A1 | * | 11/2011 | Lane | A45F 5/00 361/679.01 |
| 2011/0279959 A1 | * | 11/2011 | Lopez | A45F 5/00 361/679.03 |
| 2012/0068043 A1 | * | 3/2012 | Daigle | G06F 1/1628 248/682 |
| 2014/0191034 A1 | * | 7/2014 | Glanzer | G06K 7/089 235/449 |

* cited by examiner

*Primary Examiner* — Chun Hoi Cheung

(57) ABSTRACT

A case structure for tablet computers comprises a case body and a case support, wherein the case body is provided with a connecting pivot pivotally connected to the case body, the case support is rotatably connected to the connecting pivot, and the connecting pivot is able to drive the case support to rotate around an axis to any angle to be positioned. according to the case structure for tablet computers, a connecting pivot rotates in a direction perpendicular to the axial direction of a case body and can be positioned at any angle to enable a case support to be unfolded to support the case body on which a tablet computer is mounted after the case support is rotated and positioned at any angle, such that the tablet computer can be supported at any angle.

8 Claims, 3 Drawing Sheets

CASE STRUCTURE FOR TABLET COMPUTERS

CROSS REFERENCE TO RELATED APPLICATIONS

The present application claims the benefit of Chinese Patent Application No. 202121564731.0 filed on Jul. 8, 2021, the contents of which are incorporated herein by reference in their entirety.

TECHNICAL FIELD

The invention belongs to the field of cases for electronic products, and particularly relates to a case structure for tablet computers.

DESCRIPTION OF RELATED ART

Most tablet computer cases on the present market have only one function, and support tablet computers at several fixed angles by means of a support, thus being unable to meet the requirements of different users for supporting table computers at different angles during use.

BRIEF SUMMARY OF THE INVENTION

The main objective of the invention is to provide a case structure for tablet computers. The case structure for tablet computers is able to protect tablet computers and support the tablet computers at different angels.

A case structure for tablet computers comprises a case body and a case support, wherein the case body is provided with a connecting pivot pivotally connected to the case body, the case support is rotatably connected to the connecting pivot, and the connecting pivot is able to drive the case support to rotate around an axis to any angle to be positioned.

A case structure for tablet computers, a pivot hole is formed in the middle of the case body, the connecting pivot comprises a first pivot portion and a second pivot portion assembled on two sides of the case body to form pivot shafts, a plurality of stop hooks distributed at equal intervals by the same radian are disposed on an outer circumference of the connecting pivot, a plurality of stop grooves matching the stop hooks are disposed in the case body and are located on an inner circumference of the pivot hole, and the stop hooks contact the stop grooves to realize rotatable positioning of the connecting pivot.

A case structure for tablet computers, a rotary disk fixedly connected to the connecting pivot is disposed on a back side of the case body, and the case support is hinged to an outer circumference of the rotary disk.

A case structure for tablet computers, a rotating groove is formed in the rotary disk, a support shaft to be embedded in the rotating groove to rotate around an axis is disposed on one side of the case support, and a damping element used for rotatable positioning of the support shaft is disposed in the rotating groove.

A case structure for tablet computers, the damping element is a silicone sheet wrapping an outer circumference of the support shaft.

A case structure for tablet computers, a pen holder portion stretching out the support shaft is connected to the damping element, and is formed with a round hole allowing a pen to be inserted therein.

A case structure for tablet computers, the interior of the support shaft is hollow to form a shaft hole, and shaft seats and segmented shafts horizontally stretching out of the shaft hole from the shaft seats are fixed to two ends of the rotating groove, respectively.

A case structure for tablet computers, the shaft seats are fixedly connected to the rotary disk with screws.

A case structure for tablet computers, the case body comprises a base plate, and the connecting pivot is mounted on the base plate; the case body is further provided with a silicone jacket and a cover plate, the silicone jacket is connected to an outer circumference of the base plate and is used for wrapping a tablet computer, the cover plate is connected to the base plate by means of multiple points and covers an outer side of the tablet computer, and a sponge mat is laid in the base plate.

A case structure for tablet computers, shoulder strap fasteners are disposed at three right-angle positions of the case body.

One of the above-mentioned technical solutions of the invention has at least one of the following advantages or beneficial effects: according to the case structure for tablet computers, a connecting pivot rotates in a direction perpendicular to the axial direction of a case body and can be positioned at any angle to enable a case support to be unfolded to support the case body on which a tablet computer is mounted after the case support is rotated and positioned at any angle, such that the tablet computer can be supported at any angle.

BRIEF DESCRIPTION OF THE SEVERAL VIEWS OF THE DRAWINGS

The invention will be further described below in conjunction with accompanying drawings and embodiments.

DETAILED DESCRIPTION OF THE INVENTION

Different embodiments or examples are provided below to implement different solutions of the invention.

Figure 1:
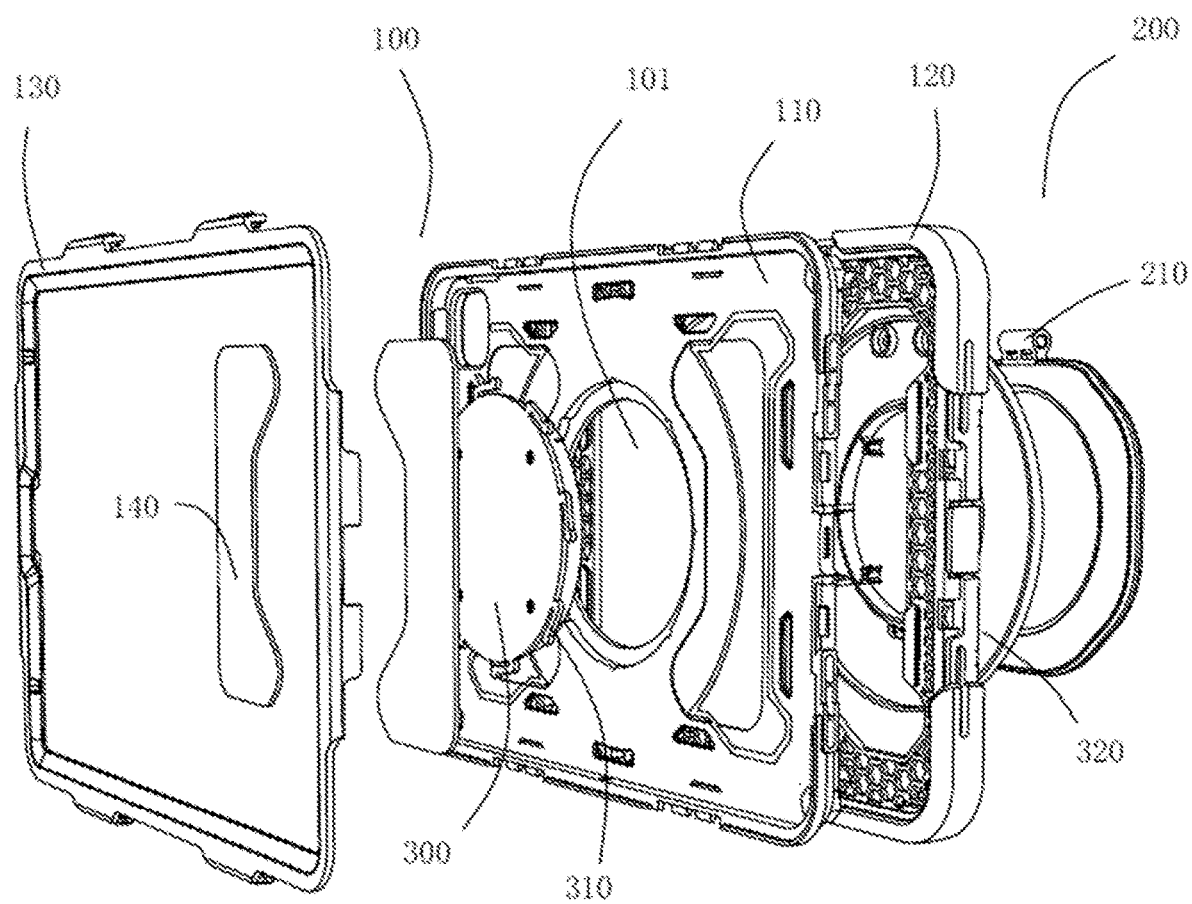
FIG. 1 is an overall structural view of a case structure for tablet computers according to one embodiment of the invention.
Figure 2:
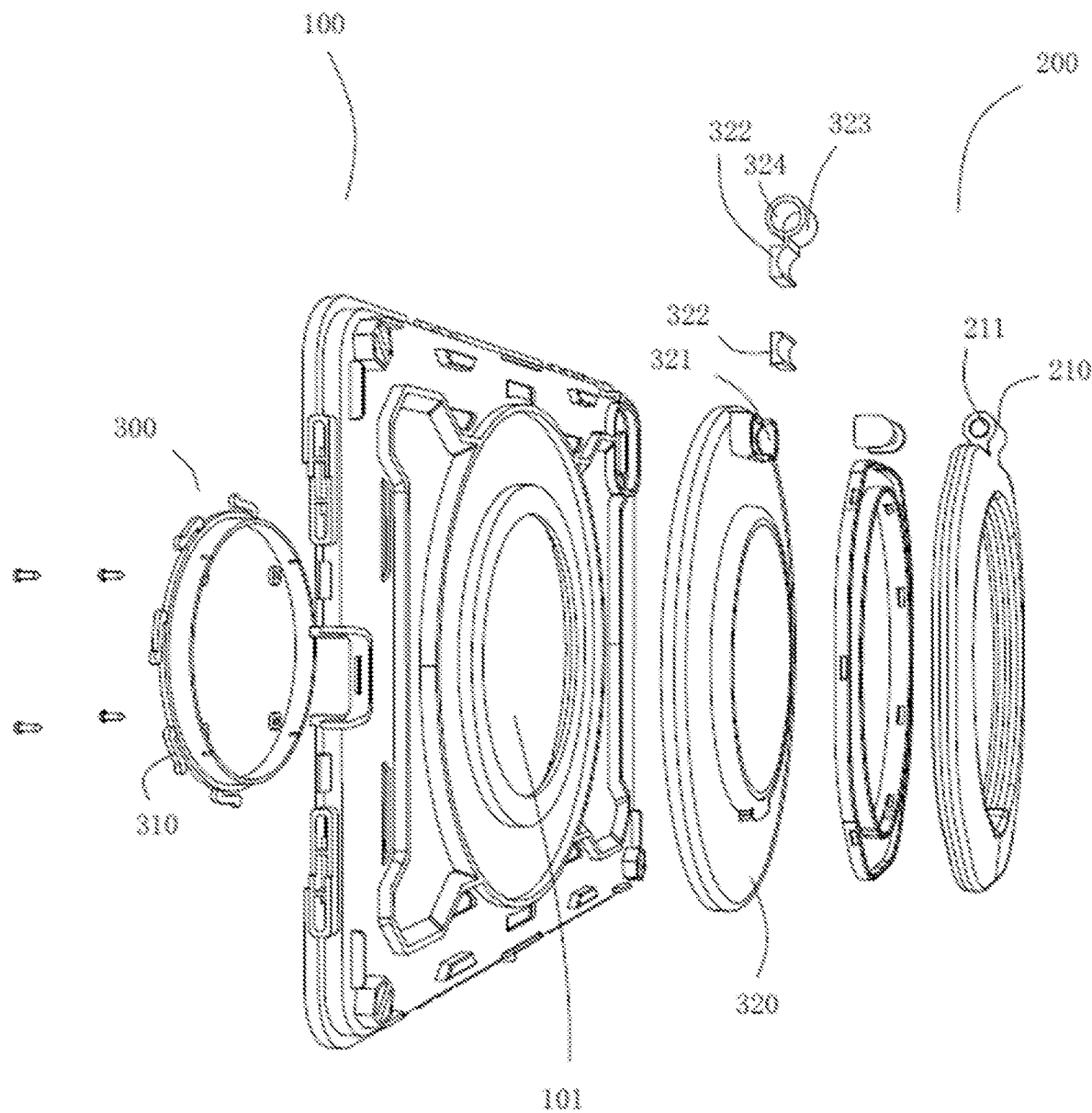
FIG. 2 is another structural view of the case structure for tablet computers according to one embodiment of the invention.
Figure 3:
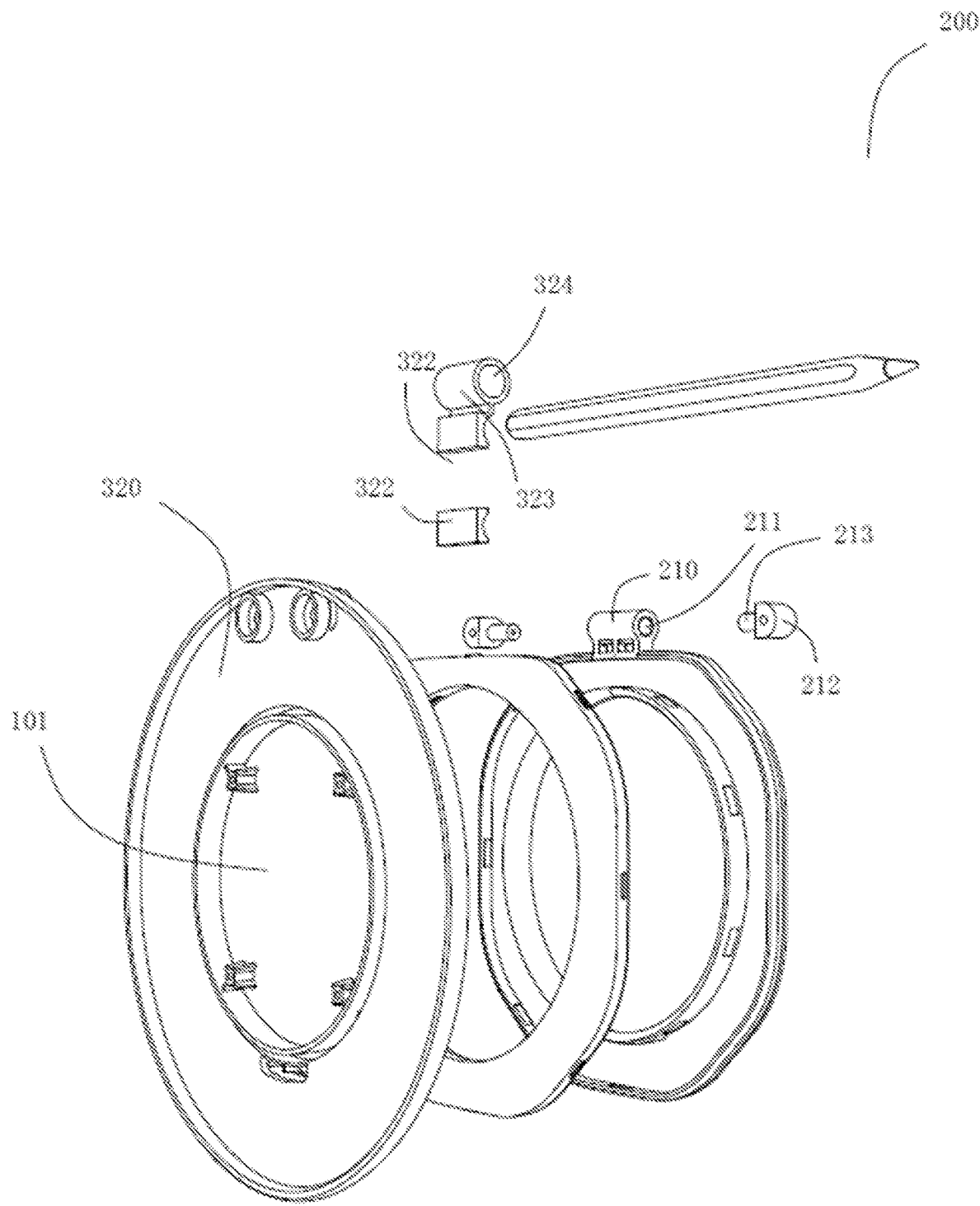
FIG. 3 is a structural view of a connecting part of a case support according to one embodiment of the invention.

Referring to FIG. 1 to FIG. 3, a case structure for tablet computers comprises a case body 100 and a case support 200, wherein the case body 100 is provided with a connecting pivot 300 pivotally connected to the case body 100, the case support 200 is rotatably connected to the connecting pivot 300, and the connecting pivot 300 is able to drive the case support 200 to rotate around an axis to any angle to be positioned.

In some embodiments of the invention, a pivot hole 101 is formed in the middle of the case body 100, the connecting pivot 300 comprises a first pivot portion and a second pivot portion assembled on two sides of the case body 100 to form pivot shafts, a plurality of stop hooks 310 distributed at equal intervals by the same radian are disposed on an outer circumference of the connecting pivot 300, a plurality of stop grooves matching the stop hooks 310 are disposed in the case body 100 and are located on an inner circumference of the pivot hole 101, and the stop hooks 310 contact the stop grooves to realize rotatable positioning of the connecting pivot 300.

In some embodiments of the invention, a rotary disk 320 fixedly connected to the connecting pivot 300 is disposed on a back side of the case body 100, and the case support 200 is hinged to an outer circumference of the rotary disk 320.

In some embodiments of the invention, a rotating groove 321 is formed in the rotary disk 320, a support shaft 210 to be embedded in the rotating groove 321 to rotate around an axis is disposed on one side of the case support 200, and a damping element 322 used for rotatable positioning of the support shaft 210 is disposed in the rotating groove 321.

In some embodiments of the invention, the damping element 322 is a silicone sheet wrapping an outer circumference of the support shaft 210.

In some embodiments of the invention, a pen holder portion stretching out the support shaft 210 is connected to the damping element 322, and is formed with a round hole 324 allowing a pen to be inserted therein.

In some embodiments of the invention, the interior of the support shaft 210 is hollow to form a shaft hole 211, and shaft seats 212 and segmented shafts 213 horizontally stretching out of the shaft hole 211 from the shaft seats 212 are fixed to two ends of the rotating groove 321, respectively.

In some embodiments of the invention, the shaft seats 212 are fixedly connected to the rotary disk 320 with screws.

In some embodiments of the invention, the case body 100 comprises a base plate 110, and the connecting pivot 300 is mounted on the base plate 110; the case body 100 is further provided with a silicone jacket 120 and a cover plate 130, the silicone jacket 120 is connected to an outer circumference of the base plate 110 and is used for wrapping a tablet computer, the cover plate 130 is connected to the base plate 110 by means of multiple points and covers an outer side of the tablet computer, and a sponge mat 140 is laid in the base plate 110.

A cover film is mounted on an inner circumference of the cover plate 130, a step groove encircling the inner circumference of the cover plate 130 is formed in an inner side of the cover plate 130, and the height of the step groove is greater than the thickness of a protective film of the tablet computer, so that the cover plate 130 is still able to cover the tablet computer even if a tempered glass film is attached to the tablet computer, and the cover film and the tablet computer protective film may co-exist and completely fit each other.

In some embodiments of the invention, shoulder strap fasteners are disposed at three right-angle positions of the case body 100.

According to the case structure for tablet computers, the connecting pivot 300 rotates in a direction perpendicular to the axial direction of the case body 100 and can be positioned at any angle to enable the case support 200 to be unfolded to support the case body 100 on which the tablet computer is mounted after the case support 200 is rotated and positioned at any angle, such that the tablet computer can be supported at any angle.

According to the case structure for tablet computers, the case body 100 and the case support 200 are connected by means of the connecting pivot 300, the connecting pivot 300 can be rotated and positioned within 360° in a direction perpendicular to the axial direction of the case body 100, the case body 100 is provided with the plurality of stop grooves distributed in the inner circumference of the pivot hole 101 at equal intervals by the same radian, and the stop hooks 310 disposed on the outer circumference of the connecting pivot 300 are elastic parts connected to the outer circumference of the connecting pivot 300. When the stop hooks 310 rotate rapidly, the elastic stop hooks 310 will be pressed to rotate rapidly in the pivot hole 101 formed with the stop grooves; and when stopped at desired positions, the stop hooks 310 will be released and stretch into the stop grooves respectively to realize angle positioning.

The support angle of the case support 200 with respect to the case body 100 can be positioned by positioning the rotation angle of the case support 200 on the support shaft 210.

The case support 200 is directly mounted on the connecting pivot 300, or is mounted on the rotary disk 320 connected to the connecting pivot 300. The support shaft 210 provided with the shaft hole 211 is disposed on the case support 200, and then two sides of the support shaft 210 are fixedly connected to the rotary disk 320 with screws. The case support 200 is rotated to enable the support shaft 210 provided with the shaft hole 211 to rotate with respect to the segmented shaft 213 on the shaft seats 212, and then the rotation angle is positioned by means of the damping element 322 disposed between the support shaft 210 and the rotating groove 321, so that the support angle of the case support 200 with respect to the rotary disk 320 is positioned.

The pen holder portion 323 horizontally stretching out of the damping element 322 allows a touch pen to be inserted therein. When the touch pen is needed, the pen holder portion 323 connected to the damping element 322 and formed with the round hole 324 may be configured.

After being wrapped with the silicone jacket 120, the tablet computer is mounted on the base plate 110, and the cover plate 130 is assembled on the front side of the tablet computer to protect the front side of the tablet computer.

The shoulder strap fasteners disposed on the case body 100 may be used in cooperation with should straps.

Although the implementations of the invention have been illustrated and described above, those ordinarily skilled in the art would appreciate that the various changes, modifications, substitutions and transformations can be made to these implementations without departing from the principle and sprit of the invention. The scope of the invention is defined by the claims and their equivalents.

What is claimed is:

1. A case structure for tablet computers comprises a case body and a case support, wherein the case body is provided with a connecting pivot pivotally connected to the case body, the case support is rotatably connected to the connecting pivot, and the connecting pivot is able to drive the case support to rotate around an axis to any angle to be positioned; a rotary disk fixedly connected to the connecting pivot is disposed on a back side of the case body, and the case support is hinged to an outer circumference of the rotary disk; a rotating groove is formed in the rotary disk, a support shaft to be embedded in the rotating groove to rotate around an axis is disposed on one side of the case support, and a damping element used for rotatable positioning of the support shaft is disposed in the rotating groove.

2. The case structure for tablet computers according to claim 1, a pivot hole is formed in the middle of the case body, the connecting pivot comprises a first pivot portion and a second pivot portion assembled on two sides of the case body to form pivot shafts, a plurality of stop hooks distributed at equal intervals by the same radian are disposed on an outer circumference of the connecting pivot, a plurality of stop grooves matching the stop hooks are disposed in the case body and are located on an inner circumference of the pivot hole, and the stop hooks contact the stop grooves to realize rotatable positioning of the connecting pivot.

3. The case structure for tablet computers according to claim 1, the damping element is a silicone sheet wrapping an outer circumference of the support shaft.

4. The case structure for tablet computers according to claim 3, a pen holder portion stretching out the support shaft is connected to the damping element, and is formed with a round hole allowing a pen to be inserted therein.

5. The case structure for tablet computers according to claim 1, the interior of the support shaft is hollow to form a shaft hole, and shaft seats and segmented shafts horizontally stretching out of the shaft hole from the shaft seats are fixed to two ends of the rotating groove, respectively.

6. The case structure for tablet computers according to claim 5, the shaft seats are fixedly connected to the rotary disk with screws.

7. The case structure for tablet computers according to claim 1, the case body comprises a base plate, and the connecting pivot is mounted on the base plate; the case body is further provided with a silicone jacket and a cover plate, the silicone jacket is connected to an outer circumference of the base plate and is used for wrapping a tablet computer, the cover plate is connected to the base plate by means of multiple points and covers an outer side of the tablet computer, and a sponge mat is laid in the base plate.

8. The case structure for tablet computers according to claim 7, shoulder strap fasteners are disposed at three right-angle positions of the case body.

\* \* \* \* \*